United States Patent
Balasubramanian

(10) Patent No.: US 9,692,635 B2
(45) Date of Patent: Jun. 27, 2017

(54) IDENTIFYING PORT MISCONNECTIONS ON A NETWORK DEVICE

(71) Applicant: Cisco Technology, Inc., San Jose, CA (US)

(72) Inventor: Sriram Balasubramanian, San Francisco, CA (US)

(73) Assignee: Cisco Technology, Inc., San Jose, CA (US)

(*) Notice: Subject to any disclaimer, the term of this patent is extended or adjusted under 35 U.S.C. 154(b) by 426 days.

(21) Appl. No.: 14/527,746

(22) Filed: Oct. 29, 2014

(65) Prior Publication Data

US 2016/0127313 A1   May 5, 2016

(51) Int. Cl.
*G06F 15/177*   (2006.01)
*H04L 12/24*   (2006.01)
*H04L 12/26*   (2006.01)

(52) U.S. Cl.
CPC ........ *H04L 41/0631* (2013.01); *H04L 41/065* (2013.01); *H04L 41/0618* (2013.01); *H04L 41/0677* (2013.01); *H04L 41/12* (2013.01); *H04L 43/0811* (2013.01)

(58) Field of Classification Search
CPC ............. H04L 41/0631; H04L 41/0677; H04L 41/065; H04L 41/12; H04L 41/0618; H04L 43/0811
See application file for complete search history.

(56) References Cited

U.S. PATENT DOCUMENTS

| | | | | |
|---|---|---|---|---|
| 7,685,223 B1* | 3/2010 | Basavaiah | ............... | H04L 67/16 709/200 |
| 7,793,145 B2* | 9/2010 | Kalwitz | .............. | G06F 11/1616 714/6.12 |
| 7,865,629 B1* | 1/2011 | Tantos | .................. | G06F 13/385 710/11 |
| 2002/0124079 A1* | 9/2002 | Pulsipher | .............. | H04L 69/324 709/224 |
| 2005/0249123 A1* | 11/2005 | Finn | .................... | H04L 12/2697 370/242 |
| 2009/0129290 A1* | 5/2009 | Seo | ........................ | H04L 49/602 370/254 |
| 2010/0265820 A1* | 10/2010 | Feng | ..................... | H04L 12/413 370/228 |

(Continued)

*Primary Examiner* — Arvin Eskandarnia
*Assistant Examiner* — Javier O Guzman
(74) *Attorney, Agent, or Firm* — Hickman Palermo Becker Bingham LLP

(57) ABSTRACT

Identifying port misconnections on a network device is disclosed. In an embodiment, host-to-port configuration data for a second network device is received at a first network device, wherein the host-to-port configuration data identifies, for each port of a plurality of ports of the second network device, a host that was connected to the port of the second network device. A particular host that is currently connected to a particular port of a plurality of ports of the first network device is determined. A second host was connected to a port of the second network device that corresponds to the particular port of the first network device, where the second host is different than the particular host, is determined. In response to determining that the particular host is different than the second host, an alert signal associated with the particular port is presented.

20 Claims, 8 Drawing Sheets

(56) References Cited

U.S. PATENT DOCUMENTS

| | | | |
|---|---|---|---|
| 2012/0079139 A1* | 3/2012 | Sonokawa | H04L 41/12 710/16 |
| 2012/0297052 A1* | 11/2012 | Qin | H04L 41/0677 709/224 |
| 2015/0156071 A1* | 6/2015 | Adolphson | H04L 41/12 370/254 |
| 2015/0229524 A1* | 8/2015 | Engebretsen | H04L 41/0853 370/254 |

* cited by examiner

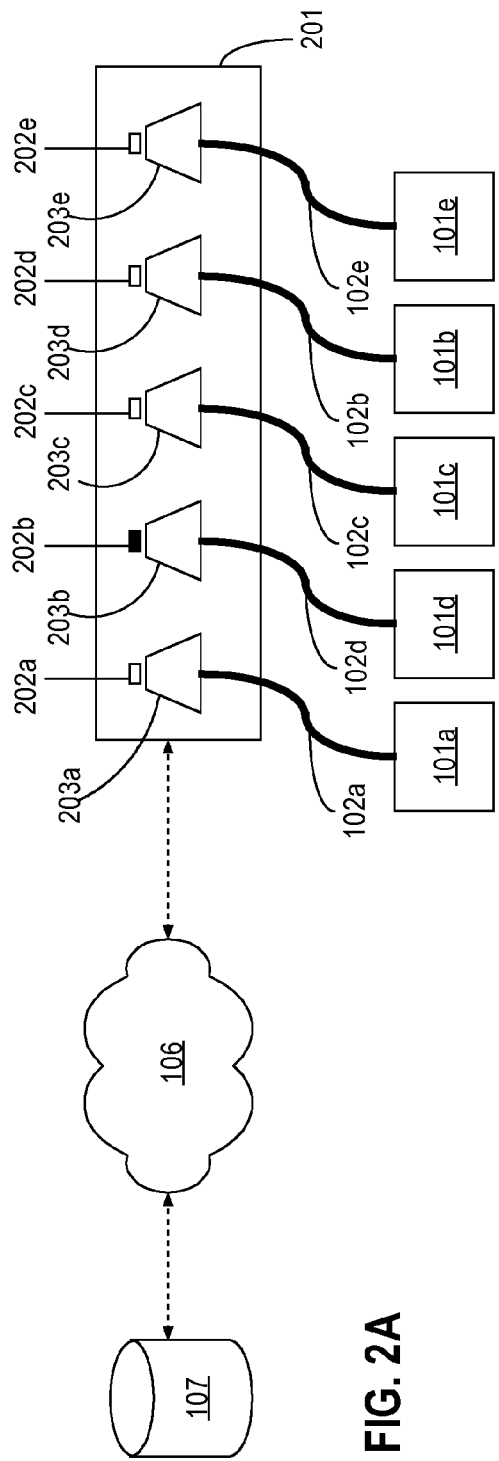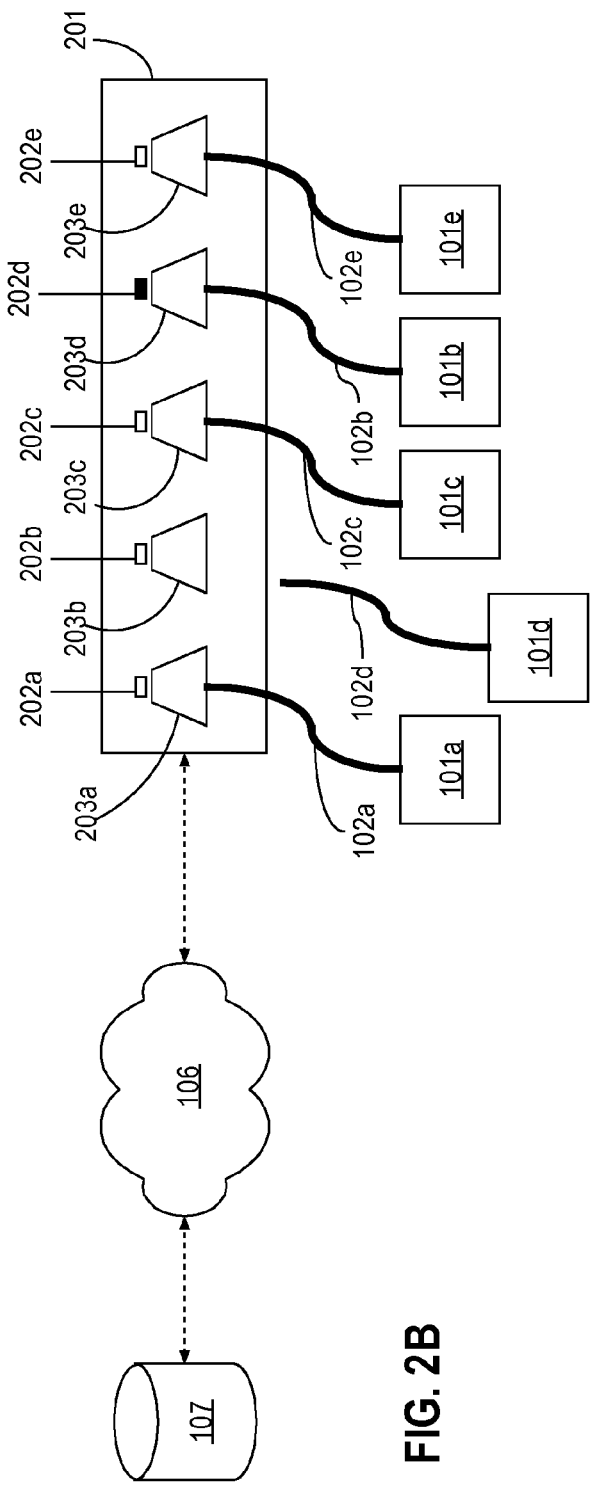

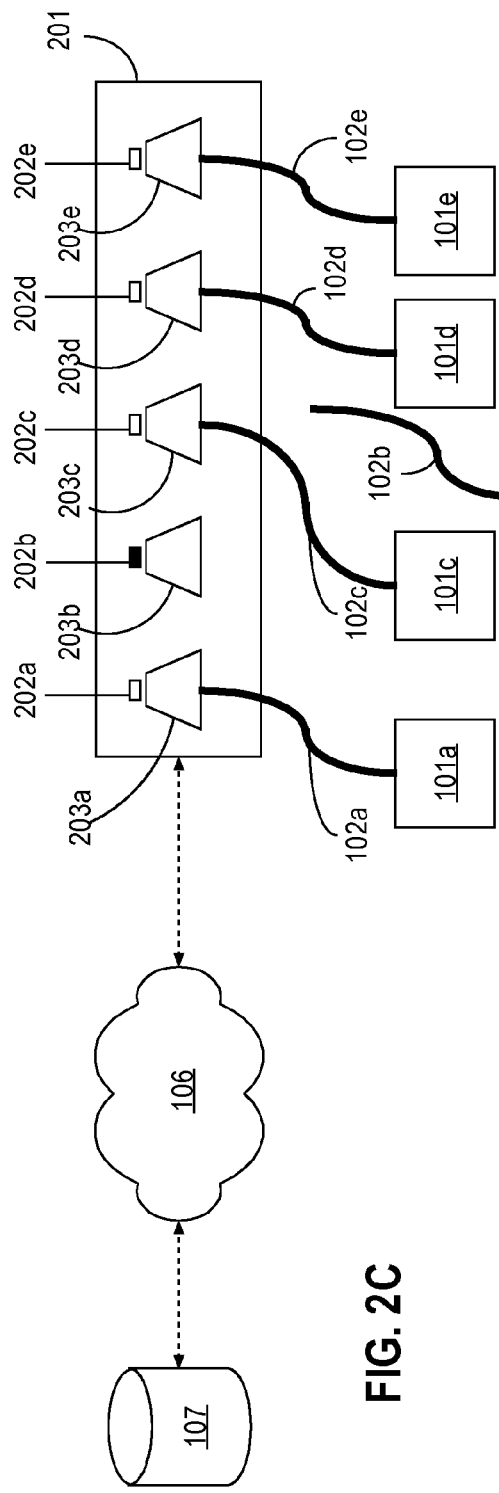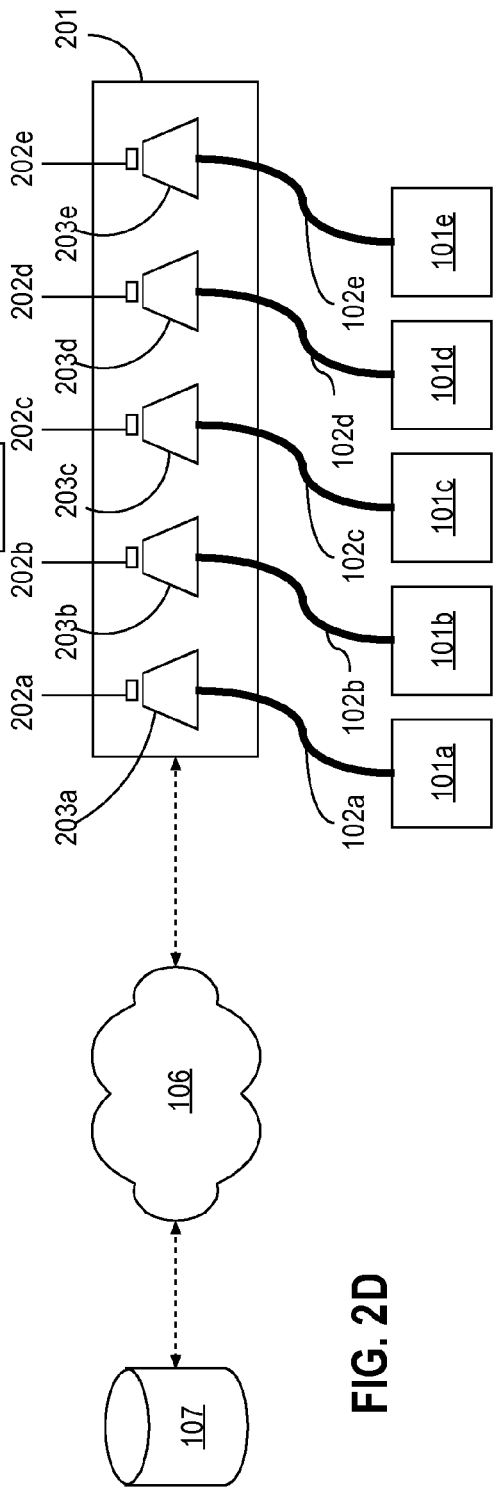

IDENTIFYING PORT MISCONNECTIONS ON A NETWORK DEVICE

TECHNICAL FIELD

The present disclosure generally relates to computer systems. The disclosure relates more specifically to identifying port misconnections on a network device.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

As a hypothetical, assume that an organization's communications network comprises several network devices and periodically, a network device may malfunction. The organization may return the device to its manufacturer and replace the malfunctioning network device with another network device that is provided by the manufacturer.

A typical problem in replacing the malfunctioning network device with another network device is port misconnections. A network device may have twenty four or forty eight ports and usually all of the ports of a network device are in use. The chances of a particular port on a network device being misconnected are non-zero. The consequences of a port being misconnected may be that one or more computing devices may be prevented from transmitting messages to and receiving messages from the network device, thus effectively removing the one or more computing devices from the organization's communications network.

BRIEF DESCRIPTION OF THE DRAWINGS

In the drawings:

FIG. 2A, FIG. 2B, FIG. 2C, FIG. 2D illustrate an example sequence of states of a network device including states in which the network device indicates the occurrence of a misconnection and identifies the correct connection.

DESCRIPTION OF EXAMPLE EMBODIMENTS

Figure 1:
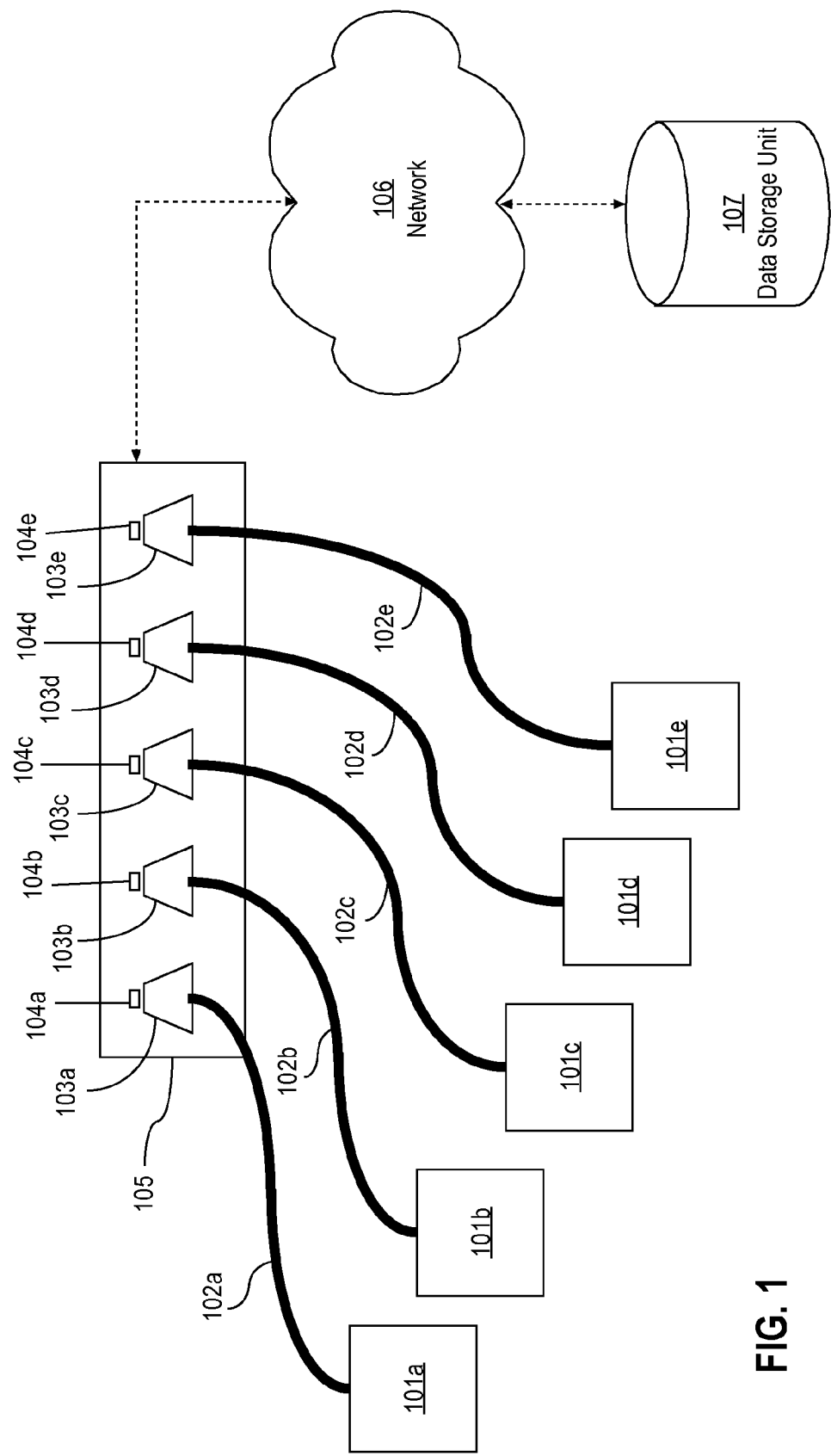
FIG. 1 illustrates an example networking arrangement of a networking device and a plurality of computing devices.

In one example embodiment, computer-implemented identification of port misconnections is described. In certain embodiments, the techniques herein provide for more efficient and accurate management of port connections by identifying port misconnections and providing assistance in correcting port misconnections. In the following description, for the purposes of explanation, numerous specific details are set forth in order to provide a thorough understanding of the present disclosure. It will be apparent, however, to one skilled in the art that the present disclosure may be practiced without these specific details. In other instances, well-known structures and devices are shown in block diagram form in order to avoid unnecessarily obscuring the present disclosure.

Embodiments are described herein according to the following outline:
 1.0 Overview
 2.0 Structural and Functional Overview
 3.0 Method of Identifying and Correcting Port Misconnections
 4.0 Other Disclosure
 5.0 Implementation Mechanisms—Hardware Overview
 6.0 Extensions and Alternatives
 1.0 Overview A method is described for identifying a port misconnection. In an embodiment, using a first network device, host-to-port configuration data for a second network device is received. The host-to-port configuration data identifies, for each port of a plurality of ports of the second network device, a host that was connected to the port of the second network device. A particular host that is currently connected to a particular port of a plurality of ports of the first network device is determined. A second host that was connected to a port of the second network device corresponding to the particular port of the first network device is determined, wherein the second host is different than the particular host. In response to determining that the particular host is different than the second host, an alert signal associated with the particular port is presented.

In other embodiments, the disclosure encompasses a data processing system, a computer apparatus and a computer-readable medium configured to carry out the foregoing steps.

2.0 Structural and Functional Overview

Certain embodiments described herein reduce or eliminate costs associated with identification and correction of host to port misconnections. In an embodiment, by utilizing host to port misconnections identification logic, computers associated with a network may indicate which ports are misconnected and identify the correct ports for the identified misconnection without resorting to time-consuming and error prone techniques, such as labeling or tagging communication cables.

As described herein, a host may be any computing device configured to transmit or receive packets including, but not limited to, end user computing devices and network devices. Each host may be identified by a unique identifier, such as a media access control (MAC) address or an identifier derived from the MAC address such as link-local internet protocol version 6 (IPv6) address.

For the purpose of illustrating a clear example, assume that a network device in a communications network comprises a plurality of ports to which a plurality of hosts are connected via communication cables. The network support personnel may desire to efficiently replace the network device with a new network device and increase the accuracy in connecting the new network device to the plurality of hosts that were connected to the old network device. The network support personnel may also desire to minimize human errors in maintaining host-to-port connection configurations and automatically track changes in host-to-port connection configurations.

In an embodiment, network devices may be implemented with port misconnections identification logic. A network device may be configured to periodically determine the hosts that are connected to the ports of the network device and store the host-to-port connection information for that particular network device in a data store. For example, the network device may receive a unique host identifier of a host that is currently connected to a port on the network device and may store a mapping that maps the unique host identifier to a port identifier that identifies the port to which the host is currently connected. The mapping of the unique host identifier to the port identifier may be stored in a data storage unit. A set of host identifiers to port identifiers mappings may be associated with a particular network device.

A network device may be configured to access the set of stored host identifiers to port identifiers mappings of a particular network device and identify port misconnections based on the set of stored mappings by determining whether each of the hosts is connected to the correct port of the network device. In an embodiment, the network device may be configured to access the set of stored mappings and identify port misconnections in response to the network device being powered on. In some embodiments, the network device may be configured to initiate the process of identifying port misconnections in response to receiving an input or selection from the network support personnel, such as a message or a signal to initiate identification of port misconnections.

In an embodiment, the new network device accesses the set of stored host identifiers to port identifiers mappings associated with the replaced network device. The new network device may initiate the port misconnections identification process to determine, for each port of the new network device, whether the host connected to the port matches the host connected to the corresponding port in the stored mappings associated with the replaced network device. An alert signal may be presented when a port misconnection is identified. In an embodiment, the alert signal may identify the correct port for the misconnected host based on the set of stored host identifiers to port identifiers mappings associated with the replaced network device. Additionally or alternatively, in an embodiment, the network device may present another alert signal identifying the correct port for the misconnected host based on the set of stored host identifiers to port identifiers mappings associated with the replaced network device.

Using the preceding techniques, in certain embodiments port misconnections may be identified more efficiently and accurately, which may reduce the amount of time required to replace a network device with another network device while minimizing human errors caused by labeling or tagging processes.

The foregoing approaches, structures, and functions are described further herein in connection to FIG. 1 and the other drawings.

FIG. 1 illustrates an example networking arrangement that depicts a network comprising a network device, a plurality of hosts, and a data storage unit. As described herein, a network device may be an electronic digital data processing device configured as an element of internetworking infrastructure, such as a router or switch or other computing devices that include routing and switching logic.

The networking arrangement of FIG. 1 comprises a plurality of hosts 101a, 101b, 101c, 101d, 101e. Hosts 101a, 101b, 101c, 101d, 101e are connected to ports 103a, 103b, 103c, 103d, 103e, respectively, of network device 105. Hosts 101a, 101b, 101c, 101d, 101e are connected to ports 103a, 103b, 103c, 103d, 103e via communication cables 102a, 102b, 102c, 102d, 102e respectively. In an embodiment, network device 105 is at least configured to receive packets from hosts 101a, 101b, 101c, 101d, 101e and transmit packets to hosts 101a, 101b, 101c, 101d, 101e via communication cables 102a, 102b, 102c, 102d, 102e respectively.

Network device 105 may be configured to retrieve data from data storage unit 107 and store data in data storage unit 107 via network 106. In an embodiment, data storage unit 107 may be included in the network device 105. In some embodiments data storage unit 107 may be included in another network device that has been configured to serve as a backup network device to network device 105. Network device 105 comprises light emitting diodes 104a, 104b, 104c, 104d, 104e, and network device 105 may be configured to present certain information related to ports 103a, 103b, 103c, 103d, 103e via light emitting diodes 104a, 104b, 104c, 104d, 104e, respectively. In an embodiment, network device 105 comprises a display panel and is configured to present certain information related to the ports of network device 105 on the display panel. In some embodiments, network device 105 may be configured to present certain information related to the ports of the network device 105 in an electronic mail message or in a graphical user interface.

Network device 105 may be configured to receive unique identifiers corresponding to hosts 101a, 101b, 101c, 101d, 101e at ports 103a, 103b, 103c, 103d, 103e, respectively. In an embodiment the unique identifier of a host is a media access control (MAC) address of the host. In some embodiments, network device 105 may determine MAC addresses of hosts 101a, 101b, 101c, 101d, 101e by sending messages to the hosts requesting their respective MAC addresses. Network device 105 may be configured to determine a unique identifier for each of the ports 103a, 103b, 103c, 103d, 103e, referred herein as port identifiers, and associate the port identifiers with their respective ports. In an embodiment, port identifiers may be the port numbers of the respective ports, for example, port identifier of port 103a will be the port number of 103a, port identifier of port 103b will be the port number of port 103b, and similarly port identifiers for ports 103c, 103d, 103e will be their respective port numbers. Network device 105 may be further configured to map each of the port identifier to the MAC address of the host that is connected to the port associated with the port identifier. The mappings of hosts to port identifiers may be associated with network device 105 and stored in data storage unit 107.

Network device 105 may be configured to identify a misconnection of a host to a port of the network device 105 based on stored mappings of hosts to port identifiers. In an embodiment, the network device 105 may be configured to use mappings associated with a different network device than network device 105. For example, network support personnel may desire to use network device 105 to replace another network device in the network and configure network device 105 to use the mappings of host identifiers to port identifiers associated with the other network device to identify any port misconnections during the replacement process.

Similarly, network device 105 may be configured to identify port misconnections after being restarted. In such a scenario, network device 105 may be configured to identify port misconnections based on the stored mappings of port identifiers to host identifiers associated with network device 105.

FIG. 2A, FIG. 2B, FIG. 2C, FIG. 2D illustrate an example sequence of states of a network device including states in which the network device indicates the occurrence of a misconnection and identifies the correct connection.

For purposes of illustrating a clear example, FIG. 2A, FIG. 2B, FIG. 2C, FIG. 2D are described in the context of the specific computing devices 105 illustrated in FIG. 1. However, the following sections may be adapted to or implemented in the context of other network configurations and are not limited to the specific context of FIG. 1.

Network device 201 is replacing network device 105 in the network that includes network device 105. Network device 201 comprises ports 203a, 203b, 203c, 203d, 203e and their corresponding light emitting diodes 202a, 202b, 202c, 202d, 202e. Network device 201 may be configured to present certain information related to ports 203a, 203b, 203c, 203d, 203e, via their corresponding light emitting diodes 202a, 202b, 202c, 202d, 202e, respectively. In an embodiment, network device 201 comprises a display panel and is configured to present certain information related to the ports of network device 201 on the display panel. In some embodiments, network device 201 may be configured to present certain information related to the ports of the network device 201 in an electronic mail message or in a graphical user interface.

Network device 201 may be configured similarly to network device 105. The mappings of host to port identifiers associated with network device 105 may be used by network device 201.

Network device 201 may be configured to retrieve data from data storage unit 107 and store data in data storage unit 107 via network 106. In an embodiment, the host to port identifier mappings associated with network device 105 may be stored in data storage unit 107 and network device 201 may be configured to access or retrieve the stored mappings from data storage unit 107.

Network device 201 may be configured to check for any port misconnections in response to detecting any of a variety of occurrences, such as the network device being powered on, a host being connected to a port of network device, or receiving an input signal or instruction corresponding to the initiation of the monitoring. Network device 201 may also check for any port misconnections in response to detecting that a port that is in use ceases to be in use and then is in use again. For example, as depicted in FIG. 2A, port 203a of network device 201 is in use since a host, host 101a, is connected to port 203a. Port 203a ceases to be in use if host 101a is disconnected from the port 203a and port 203a may be in use again if a host is connected to port 203a again. The host that is connected again to port 203a may be the same host that was disconnected from port 203a or a different host. Once port 203a is in use again, network device 201 may determine whether there are any port misconnections at any of the ports of network device 201. Network device 201 may also be configured to only determine whether a misconnection exists at port 203a.

As depicted in FIG. 2A, hosts 101a, 101d, 101c, 101b, 101e that were previously connected to another network device, such as network device 105, are now connected to ports 203a, 203b, 203c, 203d, 203e of network device 201 via communication cables 102a, 102d, 102c, 102b, 102e, respectively. Network device 201 may be configured to determine the port identifiers of ports 203a, 203b, 203c, 203d, 203e using the same or similar techniques as network device 105 used to determine the port identifiers. As a result, the port identifiers of ports 203a, 203b, 203c, 203d, 203e may match the port identifiers of ports 103a, 103b, 103c, 103d, 103e of network device 105. In an embodiment, network device 201 may be configured to use the stored mappings of host to port identifiers that are associated with network device 105 to identify port misconnections on network device 201.

Network device 201 receives the host identifier of the host connected to port 203a and based on the port identifier of port 203a compares the received host identifier with host identifier mapped to the corresponding port identifier of network device 105. In an embodiment, the port identifiers of ports of network device 201 will be configured similarly to the port identifiers of port of the network device that is replaced by network device 201, therefore, each port identifier of network device 201 will have a corresponding port identifier among the port identifiers of the network device that is replaced by network device 201. In some embodiments, the port identifiers of network device 201 may be the same as the port identifiers of the network device that is replaced by network device 201.

In FIG. 2A, the network device 201 receives the host identifier of host 101a for port 203a and based on the stored mappings of host to port identifiers associated with network device 105, network device 201 determines that a port misconnection does not exist at port 203a since the host identifier mapped to the corresponding port identifier of port 203a in the stored mappings of host to port identifiers is the host identifier of host 101a (FIG. 1 depicts host 101a connected to port 103a, the corresponding port of port 203a in this example network arrangement).

Since network device 201 determined that a port misconnection does not exist at port 203a, network device 201 next determines whether a port misconnection exists at port 203b. Network device 201 receives the host identifier of host 101d for port 203b. The stored mappings of host to port identifiers associated with network device 105 identify host identifier of host 101b for port 203b and based on the stored mappings of host to port identifiers associated with network device 105, network device 201 identifies a port misconnection at port 203b. In response to the identified port misconnection at port 203b, network device 201 presents an alert signal. In an embodiment, the alert signal is a flashing light emitting diode that is associated with port 203b such as light emitting diode 202b. Network device 201 may continue to present the alert signal for the identified port misconnection until the host connected to the identified port of the network device is disconnected. In an embodiment, network device 201 may be configured to terminate the process of identifying port misconnections or power itself off if a certain amount of time has elapsed since the identification of a port misconnection and the host connected to the identified port has not been disconnected.

In an embodiment, network device 201 may determine that a host connected to the port of the network device is disconnected from the network device by detecting that the communication cable connected to the port of network device is disconnected from the network device. In FIG. 2B, the communication cable 102d is disconnected from port 203b and, as a result, network device 201 determines that the host 101d is disconnected from network device 201. In response to detecting that host 101d is disconnected from port 203b, and based on the stored mappings of host to port identifiers associated with network device 105 and host identifier of host 101d, network device 201 presents an alert signal indicating that the correct port for host 101d is port 203d. In an embodiment, the alert signal is a flashing light emitting diode that is associated with port 203d, such as the flashing light emitting diode 202d as depicted in FIG. 2B.

Network device 201 may also determine whether the identified correct port, port 203d, is in use and if so, based on the host identifier of the host connected to port 203d and the stored mappings of host to port identifiers that are associated with network device 105, network device 201 identifies the correct port for the host connected to port 203d. In certain embodiments, network device 201 does not present the alert signal identifying the correct port for host connected to port 203d, until host 101d, the correct host for port 203d, is connected to port 203d.

In FIG. 2B, network device 201 determines that port 203d is in use since host 101b is connected to port 203d. Based on the host identifier of host 101b and a stored mapping that identifies a port identifier associated with host 101b, network device 201 identifies port 203b as the correct port for host 101b. Network device 201 is not presenting an alert signal for port 203b, such as flashing the light emitting diode 202b, the light emitting diode associated with port 203b, since host 101d is not yet connected to port 203d.

In FIG. 2C, network device 201 determines that host 101d is connected to port 203d and subsequently identifies port 203b as the correct port for host 101b, the host that was most recently disconnected from port 203d. Network device 201 may make the determination based on the host identifier of host 101b and the stored mappings of host to port identifiers. Network device 201 also presents an alert signal for port 203b by flashing light emitting diode 202b, the light emitting diode associated with port 203b. In an embodiment, network device 201 continues to flash the light emitting diode 202b until host 101b is connected to port 203b.

In FIG. 2D, network device 201 determines that host 101b is connected to port 203b. In response to this determination, network device 201 may terminate the flashing of light emitting diode 202b. Network device 201 may continue checking for any port misconnections at the remaining ports of network device 201. Based on the stored mappings of host to port identifiers associated with network device 105 and the host identifiers of the hosts connected to ports 203c, 203d, 203e, network device 201 determines that no port misconnections exist at ports 203c, 203d, 203e. In an embodiment, network device 201 may be configured to present a signal to indicate that the process of identifying port misconnections has terminated. In some embodiments, network device 201 may be configured to forward an electronic email presenting the results of the process of identifying port misconnections.

3.0 Methods of Identifying and Correcting Port Misconnections

Figure 3:
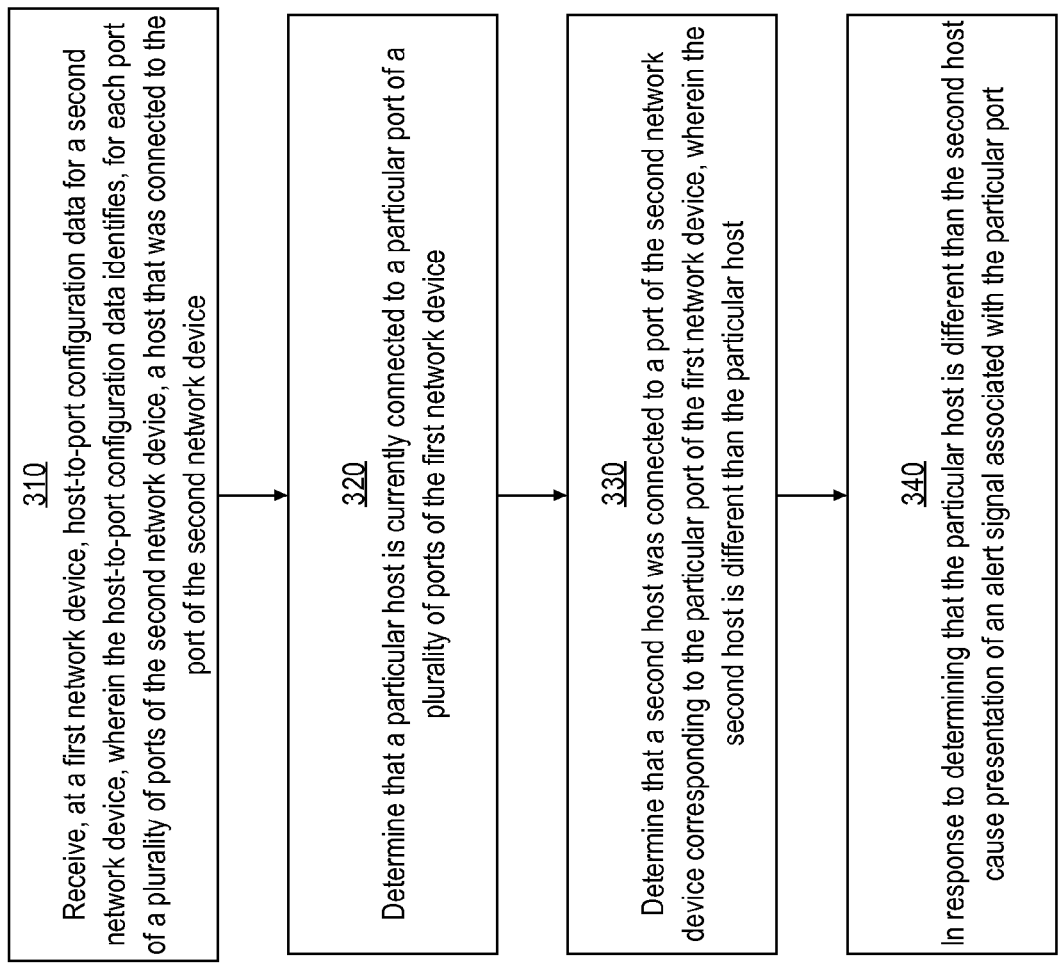
FIG. 3 illustrates an example of a method of identifying a misconnection.

FIG. 3 illustrates an example method of identifying port misconnections. In an embodiment, the operations described in connection with FIG. 3 may be performed by the network device 105 of FIG. 1, or the network device 201 of FIG. 2A, FIG. 2B, FIG. 2C, FIG. 2D. Other embodiments may implement the same functions in others contexts using other computing devices.

In step 310, at a first network device, host-to-port configuration data for a second network device is received. The host-to-port configuration data identifies, for each port of a plurality of ports at the second network device, a host that was connected to the port of the second network device. In an embodiment, the first network device is replacing the second network device. In an embodiment, the host-to-port configuration data includes mappings that map unique host identifiers to port identifiers that identify ports of the second network device to which hosts associated with the host identifiers were connected to.

In step 320, a particular host is determined to be connected to a particular port of a plurality of ports of the first network device. In an embodiment, the host identifier of the particular host connected to the particular port is received at the first network device. In an embodiment, the received host identifier may be stored in a data storage unit. In step 330, a second host is determined to have been connected to a port of the second network device. The port of the second network device corresponds to the particular port of the first network device. In an embodiment, based on the host-to-port configuration data received at the first network device, the second host is determined to have been connected to the port of the second network device that corresponds to the particular port of the first network device. In an embodiment, based on the host-to-port configuration data received at the first networking device and the host identifier of the particular host, the particular host is determined to be different than the second host. In an embodiment, the host identifier of the second host is identified from the host-to-port configuration data and compared against the host identifier of the particular host, and the particular host is determined to be different than the second host if the host identifier of the particular host is not the same as the host identifier of the second host. In an embodiment, the particular port of the first network device and the port of the second network device may have the same port number or port identifier.

In step 340, in response to determining that the particular host is different than the second host, an alert signal associated with the particular port is presented. In an embodiment, the alert signal is a flashing or blinking light emitting diode of the first network device. In an embodiment, the alert signal may be a graphical representation on an electronic display of the first network device or an electronic mail forwarded to the network support personnel, which includes the differences in the first and the second host.

Figure 4:
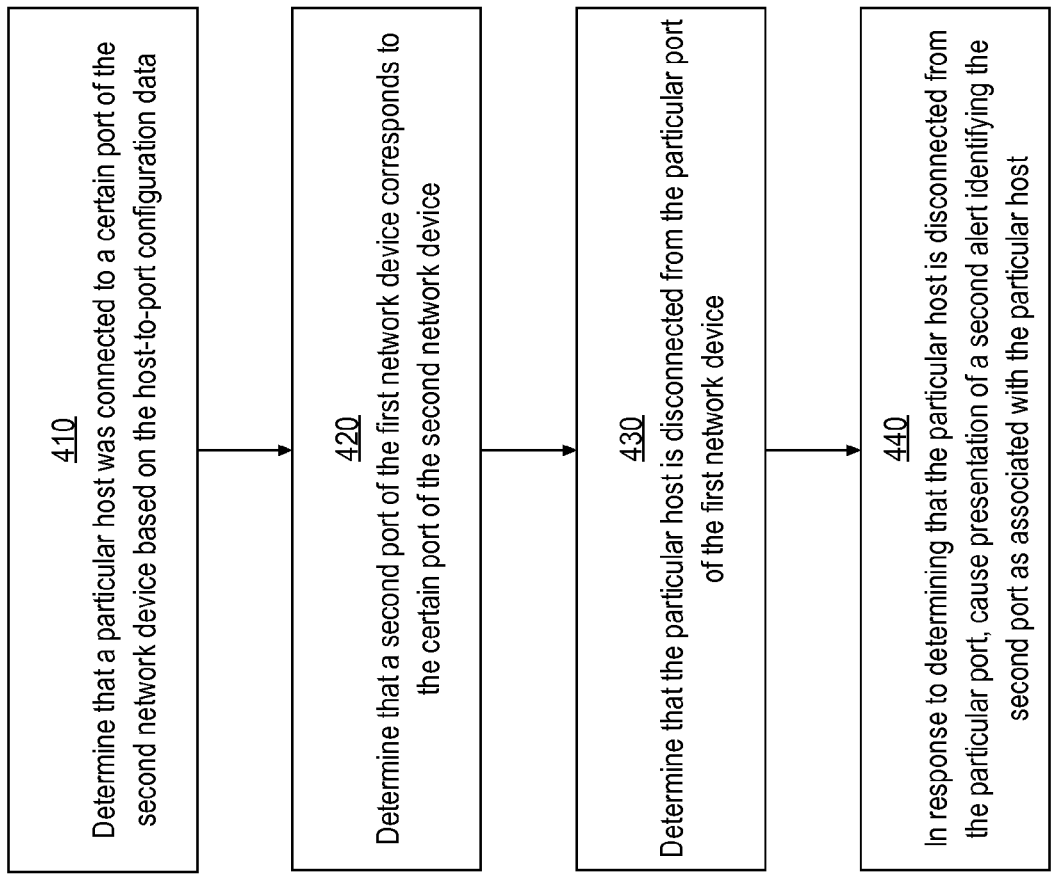
FIG. 4 illustrates an example of a method of identifying a correct port for a misconnected cable.

FIG. 4 illustrates an example method of identifying a correct port for a host that is connected to a wrong port. In an embodiment, the operations described for FIG. 4 may be performed by the network device 105 of FIG. 1, or the network device 201 of FIG. 2A, FIG. 2B, FIG. 2C, FIG. 2D, but other embodiments may implement the same functions in others contexts using other computing devices.

In step 410, using a first network device, a particular host that was connected to a certain port of the second network device is determined based on the host-to-port configuration data. The host-to-port configuration data is associated with the second network device. In an embodiment, the host-to-port configuration data provide mappings of host identifiers of hosts connected to the second network device and port identifiers of ports of the second network device.

In step 420, a second port of the first network device that corresponds to the certain port of the second network device is determined. In an embodiment, the second port of the first network device that corresponds to the certain port of the second network device is determined using the host identifier of the particular host connected to the particular port of the first network device and host-to-port configuration data received at the first network device. In an embodiment, based on the host-to-port configuration data, the first network device may be configured to identify the port identifier of the certain port, and based on the port identifier of the certain port, the first network device may identify a corresponding port of the first network device. For example, the first network device may identify that the particular host was connected to the certain port of the second network device, based on the host identifier of the particular host and the host-to-port configuration data. The first network device, based on the host-to-port configuration data, may identify the port identifier of the certain port of the second network device, and based on the port identifier of the certain port of the second network device, the first network device may identify a port of the first network device that corresponds to the certain port of the second network device.

In step 430, the particular host connected to the particular port of the first network device is determined to be disconnected from the particular port of the first network device. In an embodiment, the first network device may be configured to provide a signal indicating that a host connected to a port of the first network device has been disconnected to an application or a service, such as Cisco IOS, implemented on the first network device.

In step 440, in response to determining that the particular host is disconnected from the particular port, the first network device presents a second alert signal. In an embodiment, the second alert signal identifies the second port as associated with the particular host. In an embodiment, the second alert signal is associated with the second port of the first network device. In an embodiment, the second alert signal may be a flashing or blinking light emitting diode, a graphical representation on the display panel of the first network device, or an electronic mail forwarded to the network support personnel, which includes information of the particular host and the second port of the first network device.

Figure 5:
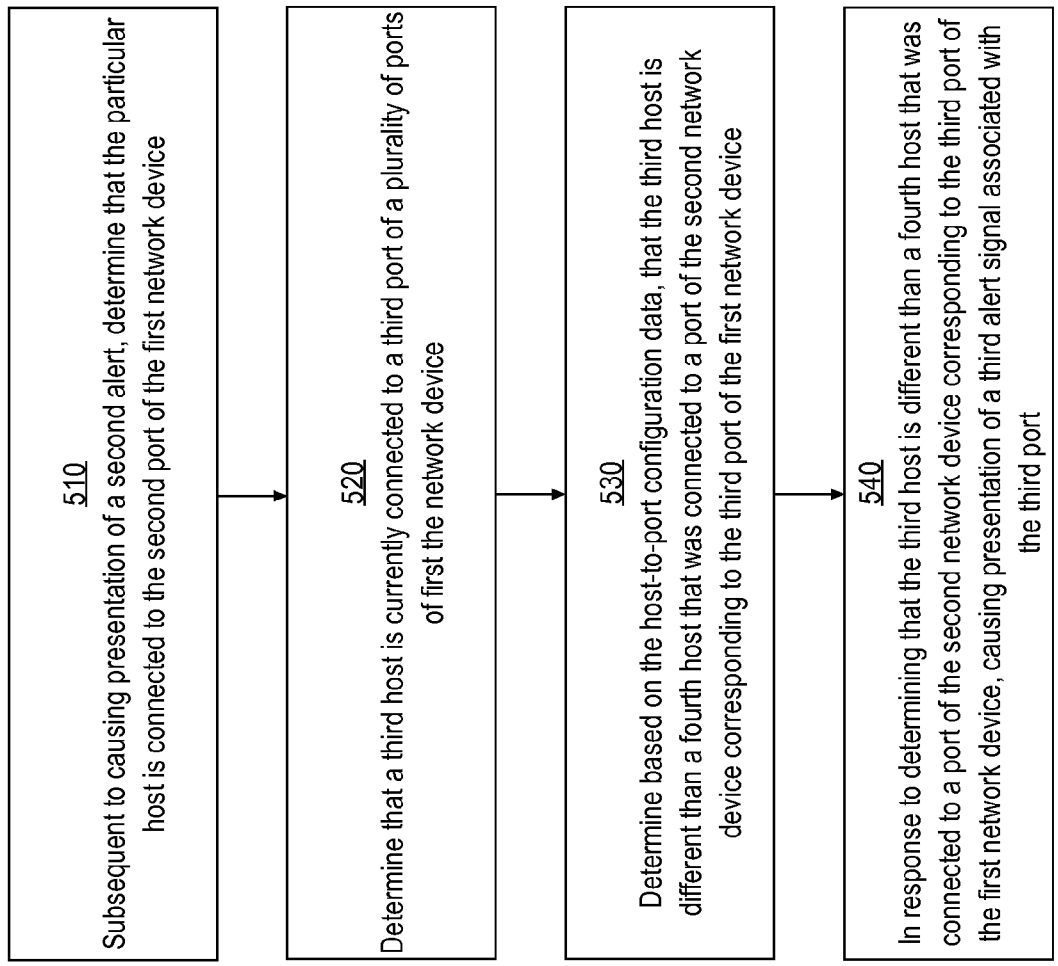
FIG. 5 illustrates an example of a method of identifying misconnections when multiple cables are misconnected.

FIG. 5 illustrates an example method of identifying a second port misconnection after a first port misconnection has been resolved. In an embodiment, the operations described for FIG. 5 may be performed by the network device 105 of FIG. 1, or the network device 201 of FIG. 2A, FIG. 2B, FIG. 2C, FIG. 2D, but other embodiments may implement the same functions in others contexts using other computing devices.

In step 510, the particular host that was connected to a first port of the first network device is determined to be connected to the port associated with the second alert signal, the second port of the first network device. The first network device is replacing the second network device in a network that comprises the second network device. In step 520, a third host is determined to be connected to a third port of the plurality of ports of the first network device.

In step 530, based on the host-to-port configuration data, the third host is determined to be different than a fourth host that was connected to a port of the second network device, wherein the port of the second network device corresponds to the third port of the first network device. In step 540, the first network device causes presentation of a third alert signal associated with the third port, in response to determining that the third host is different than the fourth host that was connected to a port of the second network device corresponding to the third port the first network device.

Figure 6:
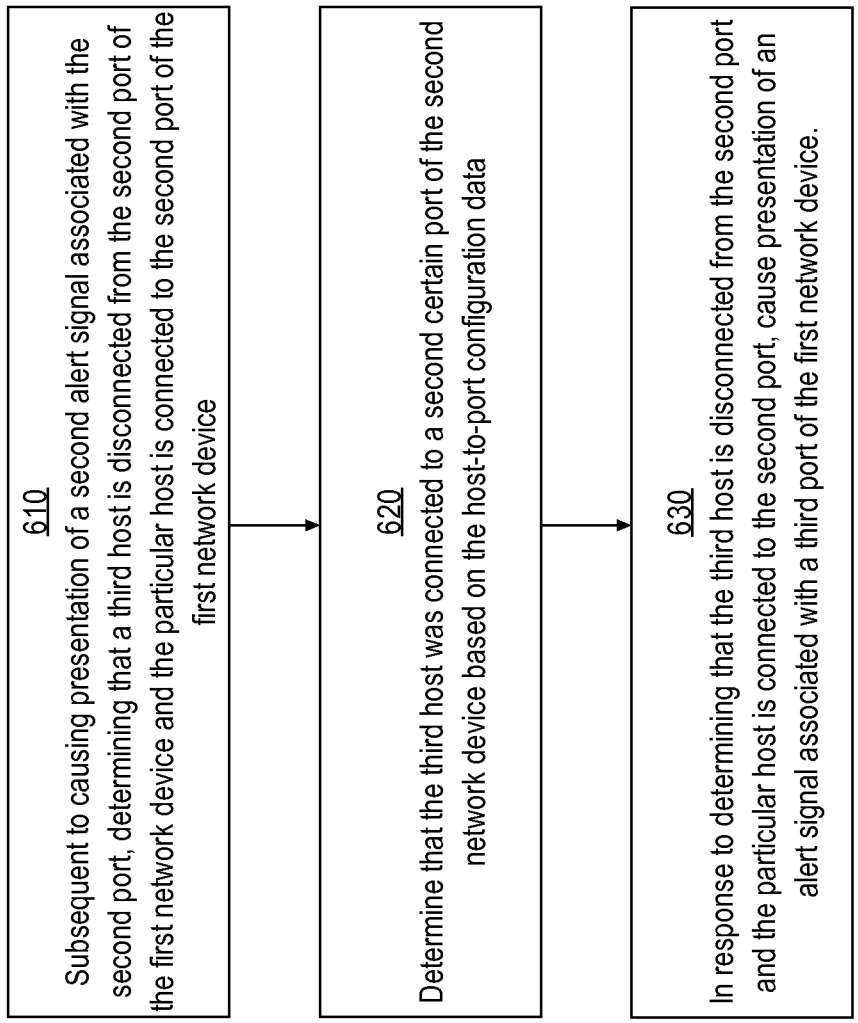
FIG. 6 illustrates an example of a method of identifying correct ports when multiple cables are misconnected.

FIG. 6 illustrates an example method of identifying a correct port for a host that is connected to a port that has been identified as the correct port for another host. In an embodiment, the operations described for FIG. 6 may be performed by the network device 105 of FIG. 1, or the network device 201 of FIG. 2A, FIG. 2B, FIG. 2C, FIG. 2D, but other embodiments may implement the same functions in others contexts using other computing devices.

In step 610, subsequent to causing the presentation of a second alert signal associated with the second port in FIG. 4, the first network device determines that a third host is disconnected from the second port and that the particular host that was connected to a first port of the first network device is connected to the second port of the first network device. In step 620, based on the host-to-port configuration data, the first network device determines that the third host was connected to a second certain port of the second network device. In an embodiment, the first network device determines that the third host was connected to a second certain port of the second network device based on the host identifier of the third host and the host-to-port configuration data. The second network device is network device being replaced by the first network device. In an embodiment, the host-to-port configuration data is the host-to-port configuration data associated with the second network device. In an embodiment, the host-to-port configuration data includes mappings of host identifiers to port identifiers, wherein a particular host identifier is mapped to a particular port identifier.

In step 630, the first network device causes presentation of an alert signal associated with a third port of the first network device in response to determining that the third host is disconnected from the second port of the first network device and that the particular host that was connected to a first port of the first network device is connected to the second port of the first network device. The third port of the first network device corresponds to the second certain port of the second network device to which the third host was connected. In an embodiment, based on the host-to-port configuration data, the first network device may identify the port identifier of the second certain port of the second network device, and based on the port identifier of the second certain port, the first network device may determine that the third port is the corresponding port of the first network device. In an embodiment, the port identifier of the third port of the first network device may be the same as the port identifier of the second certain port of the second network device and the first network device may be configured to determine a port of the first network device to be a corresponding port of the second network device if the port identifier of the port of the second network device matches the port identifier of the port of the first network device.

Therefore, in certain embodiments, the long-felt but unfulfilled need for better management and tracking of host-to-port connections and automatically identifying and correcting of incorrect host connections are now fulfilled.

4.0 Other Disclosure

The disclosure also encompasses the subject matter set forth in the following numbered clauses:

1. A non-transitory computer-readable storage media storing one or more sequences of instructions which, when executed by the one or more processors, cause the one or more processors to perform: using a first network device, receiving host-to-port configuration data for a second network device, wherein the host-to-port configuration data identifies, for each port of a plurality of ports of the second network device, a host that was connected to the port of the second network device; using the first network device, determining that a particular host is currently connected to a particular port of a plurality of ports of the first network device; using the first network device, determining that a second host was connected to a port of the second network device corresponding to the particular port of the first network device, wherein the second host is different than the particular host; in response to determining that the particular host is different than the second host, causing presentation of an alert signal associated with the particular port.

2. The non-transitory computer-readable storage media of clause 1, further comprising instructions which when executed cause the one or more processors to perform causing presentation of a subsequent alert signal relating to any ports of the plurality of ports of the first network device other than the particular port only in response to determining that the particular host has been disconnected from the particular port.

3. The non-transitory computer-readable storage media of clause 1, further comprising instructions which when executed cause the one or more processors to perform:

determining, based on the host-to-port configuration data, that the particular host was connected to a certain port of the second network device; determining that a second port of the first network device corresponds to the certain port of the second network device; determining that the particular host is disconnected from the particular port of the first network device; in response to determining that the particular host is disconnected from the particular port, causing presentation of a second alert signal identifying the second port of the first network device as associated with the particular host.

4. The non-transitory computer-readable storage media of clause 3, further comprising instructions which when executed cause the one or more processors to perform: subsequent to causing presentation of a second alert signal, determining that the particular host is connected to the second port of the first network device; determining that a third host is currently connected to a third port of a plurality of ports of the first network device; determining, based on the host-to-port configuration data, that the third host is different than a fourth host that was connected to a port of the second network device corresponding to the third port of the first network device; in response to determining that the third host is different than a fourth host that was connected to a port of the second network device corresponding to the third port of the first network device, causing presentation of an alert signal associated with the third port.

5. The non-transitory computer-readable storage media of clause 3, further comprising instructions which when executed cause the one or more processors to perform: subsequent to causing presentation of a second alert signal associated with the second port, determining that a third host is disconnected from the second port and the particular host is connected to the second port; determining that the third host was previously connected to a second certain port at the previously connected network device based on the host-to-port configuration data; in response to determining that the third host is disconnected from the second port and the particular host is connected to the second port, causing presentation of an alert signal associated with a third port at the particular network device.

6. The non-transitory computer-readable storage media of clause 1, wherein the host-to-port configuration data identifies, for each port of the plurality of ports of the second network device, a host identifier of a host that was connected to the port of the second network device.

7. The non-transitory computer-readable storage media of clause 1, further comprising instructions which when executed cause the one or more processors to perform: determining a port identifier identifying the particular port of the plurality of ports of the first network device; receiving a host identifier of the particular host that is currently connected to the particular port; associating the port identifier with the host identifier; storing the association of the port identifier with the host identifier at a storage unit.

8. The non-transitory computer-readable storage media of clause 7, wherein the host identifier is a media access control (MAC) address of the particular host.

9. The non-transitory computer-readable storage media of clause 7, wherein the port identifier is a port number of the particular port.

10. The non-transitory computer-readable storage media of clause 1, wherein causing presentation of the alert signal comprises causing blinking a light-emitting diode of the particular port.

11. The non-transitory computer-readable storage media of clause 1, wherein the alert signal is an audible alert emitted by the network device.

12. A non-transitory computer-readable storage media storing one or more sequences of instructions which, when executed by the one or more processors, cause the one or more processors to perform: using a first internetworking device, receiving host-to-port configuration data for a second internetworking device, wherein the host-to-port configuration data identifies, for each port of a plurality of ports at the second internetworking device, a computer that was previously connected to the port; using the first internetworking network device, determining that a particular computer is currently connected to a particular port of a plurality of ports of the first internetworking device; using the first internetworking network device, determining that a second computer was connected to a port of the second internetworking device corresponding to the particular port of the first internetworking device, wherein the second computer is different than the particular computer; in response to determining that the particular computer is different than the second computer, causing blinking of a light-emitting diode (LED) that is associated with the particular port and externally visible from a chassis of the first internetworking device using a blinking pattern that signifies a connection error.

5.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
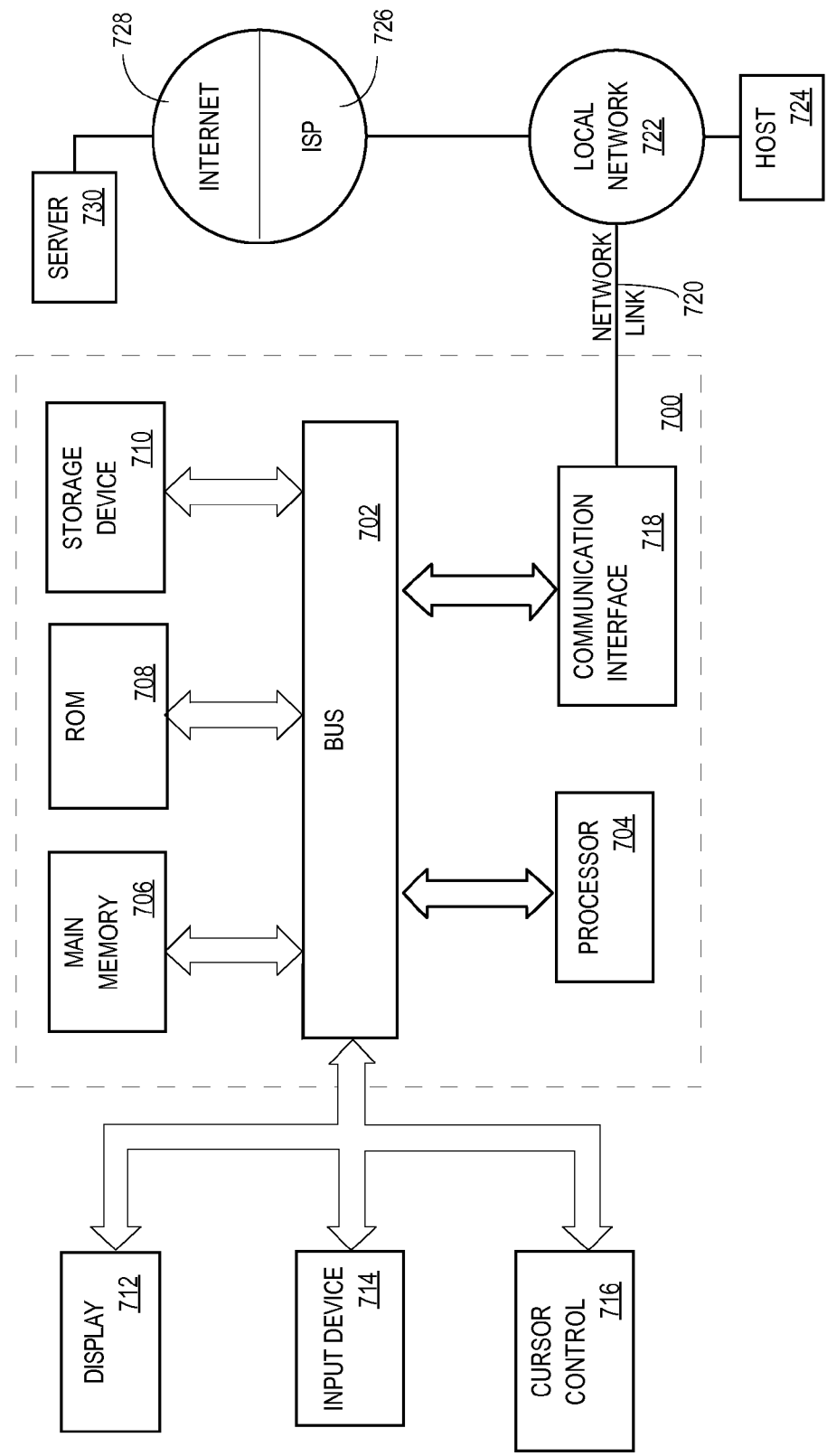
FIG. 7 illustrates a computer system upon which an embodiment may be implemented.

For example, FIG. 7 is a block diagram that illustrates a computer system 700 upon which an embodiment of the disclosure may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

6.0 Extensions and Alternatives

In the foregoing specification, embodiments of the disclosure have been described with reference to numerous specific details that may vary from implementation to implementation. Thus, the sole and exclusive indicator of what is the disclosure, and is intended by the applicants to be the disclosure, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
   receiving, using a first network device, host-to-port configuration data for a second network device,
   wherein the host-to-port configuration data identifies, for each port of a plurality of ports of the second network device, a host that was connected to the port of the second network device;
   determining, using the first network device, that a particular host is connected to a particular port of a plurality of ports of the first network device;
   determining, using the first network device, whether the second host s different than the particular host, by determining that a second host was connected to a port of the second network device corresponding to the particular port of the first network device, and causing, in response to determining that the particular host is different than the second host, presentation of an alert signal associated with the particular port.

2. The method of claim 1, further comprising causing, using the first network device, presentation of a subsequent alert signal relating to any ports of the plurality of ports of the first network device other than the particular port only in response to determining that the particular host has been disconnected from the particular port.

3. The method of claim 1, further comprising:
determining, based on the host-to-port configuration data, that the particular host was connected to a certain port of the second network device;
determining that a second port of the first network device corresponds to the certain port of the second network device;
determining that the particular host is disconnected from the particular port of the first network device; and
causing, in response to determining that the particular host is disconnected from the particular port, presentation of a second alert signal identifying the second port of the first network device as associated with the particular host.

4. The method of claim 3, further comprising:
determining, subsequent to causing presentation of a second alert signal, that the particular host is connected to the second port of the first network device;
determining that a third host is connected to a third port of a plurality of ports of the first network device;
determining, based on the host-to-port configuration data, that the third host is different than a fourth host that was connected to a port of the second network device corresponding to the third port of the first network device; and
causing, in response to determining that the third host is different than a fourth host that was connected to a port of the second network device corresponding to the third port of the first network device, presentation of an alert signal associated with the third port.

5. The method of claim 3, further comprising:
determining, subsequent to causing presentation of a second alert signal associated with the second port, that a third host is disconnected from the second port and the particular host is connected to the second port;
determining that the third host was previously connected to a second certain port at the previously connected network device based on the host-to-port configuration data; and
causing, in response to determining that the third host is disconnected from the second port and the particular host is connected to the second port, presentation of an alert signal associated with a third port at the particular network device.

6. The method of claim 1, wherein the host-to-port configuration data identifies, for each port of the plurality of ports of the second network device, a host identifier of a host that was connected to the port of the second network device.

7. The method of claim 1, further comprising:
determining a port identifier identifying the particular port of the plurality of ports of the first network device;
receiving a host identifier of the particular host that is connected to the particular port;
associating the port identifier with the host identifier; and
storing the association of the port identifier with the host identifier.

8. The method of claim 7, wherein the host identifier is a media access control (MAC) address of the particular host.

9. The method of claim 7, wherein the port identifier is a port number of the particular port.

10. The method of claim 1, wherein causing presentation of the alert signal comprises causing a light-emitting diode of the particular port to blink.

11. The method of claim 1, wherein the alert signal is an audible alert emitted by the network device.

12. A computer-implemented method comprising:
receiving, using a first internetworking device, host-to-port configuration data for a second internetworking device,
wherein the host-to-port configuration data identifies; for each port of a plurality of ports at the second internetworking device, a computer that was previously connected to the port;
determining, using the first internetworking network device, that a particular computer is connected to a particular port of a plurality of ports of the first internetworking device;
determining, using the first internetworking network device, whether the second computer is different than the particular computer, by determining that a second computer was connected to a port of the second internetworking device corresponding to the particular port of the first internetworking device,
causing, in response to determining that the particular computer is different than the second computer, causing blinking of alight-emitting diode (LED) that is associated with the particular port and externally visible from a chassis of the first internetworking device using a blinking pattern that signifies a connection error.

13. A first network device, comprising:
one or more processors;
one or more network interfaces that are configured to be coupled to a communications network that comprises one or more hosts;
one or more non-transitory computer-readable storage media storing one or more sequences of instructions which, when executed by the one or more processors, cause the one or more processors to perform operations comprising: receiving host-to-port configuration data for a second network device,
wherein the host- to-port configuration data identifies, for each port of a plurality of ports of the second network device, a host that was connected to the port of the second network device;
determining that a particular host is currently connected to a particular port of a plurality of ports of the first network device;
determining, using the first network device whether the second host is different than the that a second host was connected to a port of the second network device corresponding to the particular port of the first network device;
and causing, in response to determining that the particular host is different than the second host, presentation of an alert signal associated with the particular port.

14. The first network device of claim 13, the storage media further comprising instructions which when executed cause the one or more processors to perform causing presentation of a subsequent alert signal relating to any ports of the plurality of ports of the first network device other than the particular port only in response to determining that the particular host has been disconnected from the particular port.

15. The first network device of claim 13, the storage media further comprising instructions which when executed cause the one or more processors to perform operations comprising:
    determining, based on the host-to-port configuration data, that the particular host was connected to a certain port of the second network device;
    determining that a second port of the first network device corresponds to the certain port of the second network device;
    determining that the particular host is disconnected from the particular port of the first network device;
    causing, in response to determining that the particular host is disconnected from the particular port, presentation of a second alert signal identifying the second port of the first network device as associated with the particular host.

16. The first network device of claim 15, the storage media further comprising instructions which when executed cause the one or more processors to perform operations comprising:
    subsequent to causing presentation of a second alert signal, determining that the particular host is connected to the second port of the first network device;
    determining that a third host is currently connected to a third port of a plurality of ports of the first network device;
    determining, based on the host-to-port configuration data, that the third host is different than a fourth host that was connected to a port of the second network device corresponding to the third port of the first network device;
    causing, in response to determining that the third host is different than a fourth host that was connected to a port of the second network device corresponding to the third port of the first network device, presentation of an alert signal associated with the third port.

17. The first network device of claim 15, the storage media further comprising instructions which when executed cause the one or more processors to perform operations comprising:
    determining, subsequent to causing presentation of a second alert signal associated with the second port, that a third host is disconnected from the second port and the particular host is connected to the second port;
    determining that the third host was connected to a second certain port at the second network device based on the host-to-port configuration data;
    causing, in response to determining that the third host is disconnected from the second port and the particular host is connected to the second port, presentation of an alert signal associated with a third port at the particular network device.

18. The first network device of claim 13, wherein the host-to-port configuration data identifies, for each port of the plurality of ports of the second network device, a host identifier of a host that was connected to the port of the second network device.

19. The first network device of claim 13, the storage media further comprising instructions which when executed cause the one or more processors to perform operations comprising:
    determining a port identifier identifying the particular port of the plurality of ports of the first network device;
    receiving a host identifier of the particular host that is currently connected to the particular port;
    associating the port identifier with the host identifier;
    storing the association of the port identifier with the host identifier.

20. The first network device of claim 13, wherein causing presentation of the alert signal comprises causing blinking a light-emitting diode of the particular port.

* * * * *